March 21, 1939. E. N. JACOBI 2,151,113
LOCK
Filed Dec. 9, 1937 3 Sheets-Sheet 1

Inventor:
Edward N. Jacobi

March 21, 1939.                E. N. JACOBI                2,151,113
                                  LOCK
                           Filed Dec. 9, 1937           3 Sheets-Sheet 2
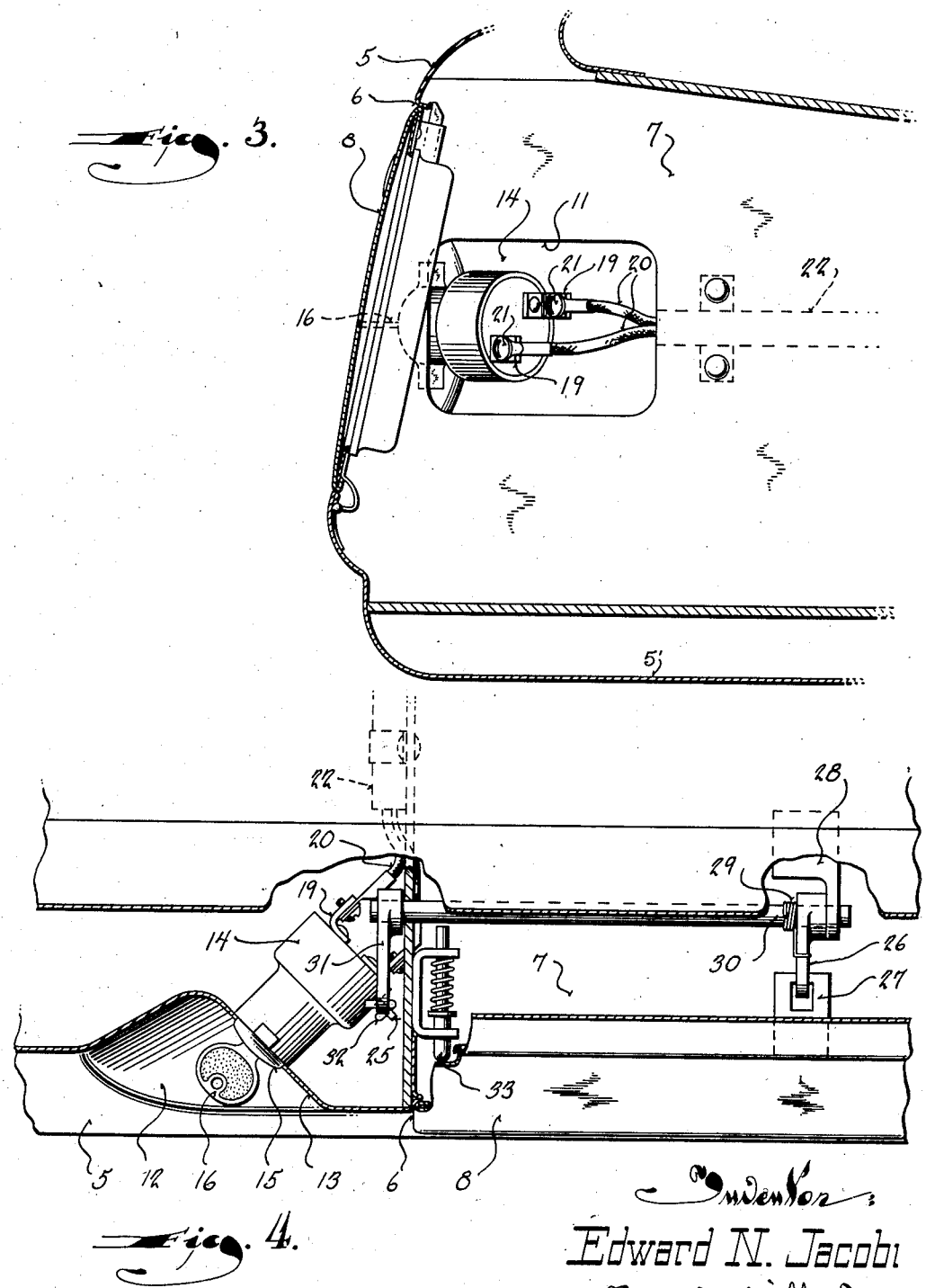
Inventor
Edward N. Jacobi March 21, 1939.  E. N. JACOBI  2,151,113
LOCK
Filed Dec. 9, 1937  3 Sheets-Sheet 3

Inventor:
Edward N. Jacobi
By Ira Milton Jones
A. Warner

Patented Mar. 21, 1939

2,151,113

UNITED STATES PATENT OFFICE 2,151,113

LOCK

Edward N. Jacobi, Milwaukee, Wis., assignor to Briggs & Stratton Corporation, Milwaukee, Wis., a corporation of Delaware Application December 9, 1937, Serial No. 178,953

13 Claims. (Cl. 180—90)

This invention relates to automobile locks and refers particularly to locks mounted on the instrument panel of an automobile for the purpose of locking the ignition or any other part or accessory of the automobile, such as the glove compartment door, the radio, and the hood.

One of the objects of this invention is to provide a lock switch having terminals to which the conductors of the circuit to be controlled are attached, and to so mount the lock switch in juxtaposition to one side wall of a glove compartment that its terminals are accessible only from inside the glove compartment through a hole in its side wall, thereby obviating the need for an armoured cable leading from the switch to the engine compartment.

Another object of this invention is to so mount a lock of the character described that its front end faces the driver's seat although mounted near the opposite end of the instrument panel.

It is also an object of this invention to so mount a lock switch on an instrument panel that the key when in place does not project beyond the face of the instrument panel.

Another object of this invention is to provide a construction whereby an ignition lock switch may be used to lock the door of the glove compartment.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiment of the invention constructed according to the best modes so far devised for the practical application of the principles thereof, and in which:

Figure 3 is a cross sectional view taken through Figure 2 on the plane of the line 3—3;

Figure 4 is a horizontal sectional view similar to Figure 1, but showing a slightly modified embodiment of the invention;

Figures 1, 2:
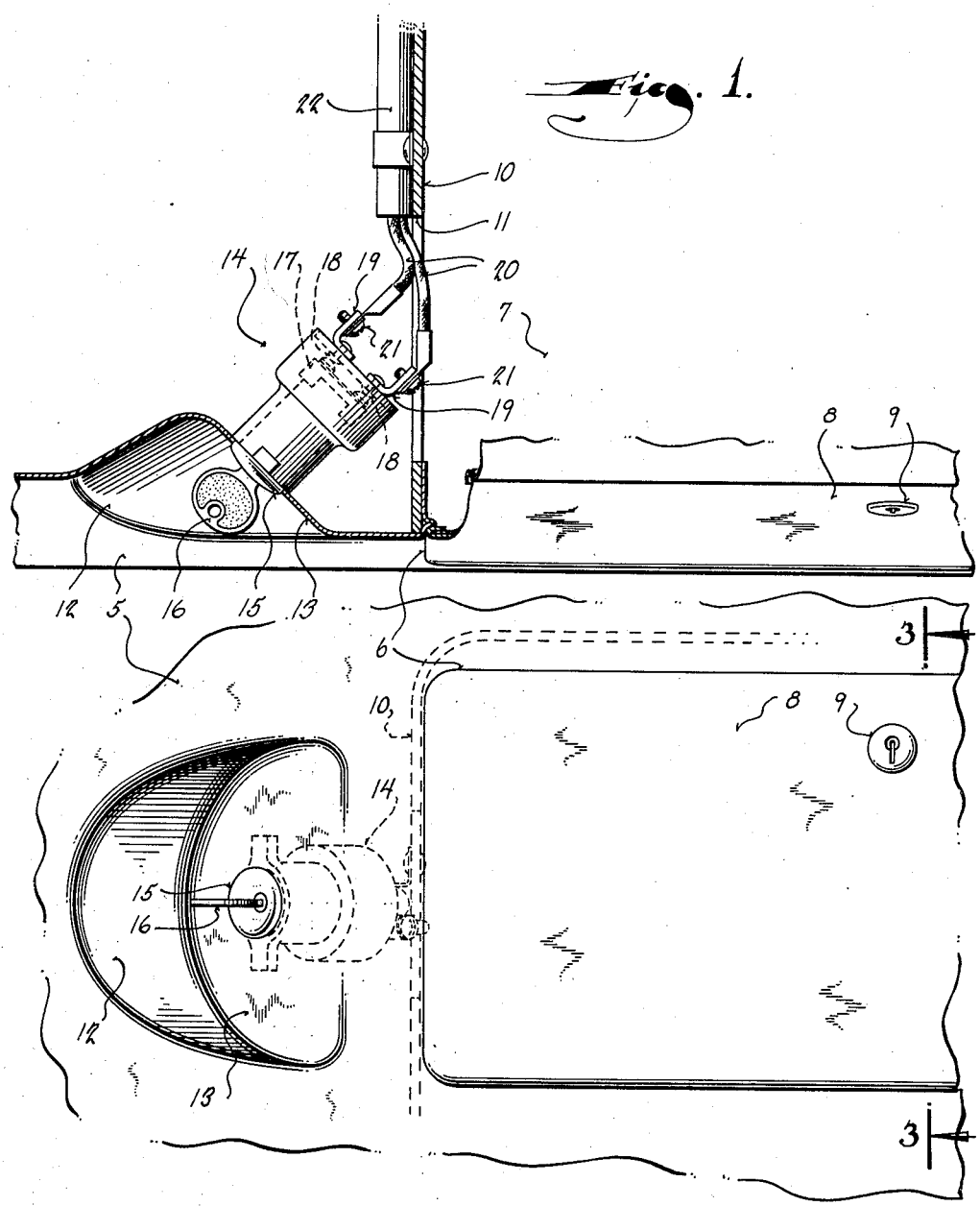
Figure 1 is a horizontal sectional view through a portion of an automobile instrument panel showing the manner in which the lock switch is mounted in juxtaposition to the glove compartment.
Figure 2 is a front view of that portion of the instrument panel shown in Figure 1.

Referring now particularly to the accompanying drawings in which like numerals indicate like parts throughout the several views, the numeral 5 designates an automobile instrument panel provided with an opening 6 which serves as an entrance to a glove compartment 7 located behind the panel. The opening 6 is closed by a door 8, usually hinged at the bottom, and adapted to be locked closed by any suitable locking mechanism, including a lock cylinder 9 having its front end projecting through a hole in the door.

It is to be observed that the panel has a flange 5' extending back from its lower edge. The side wall 10 of the glove compartment which faces the driver's seat has a hole 11, for a purpose to be hereinafter described.

Directly to the left of the glove compartment, the instrument panel is provided with a recess 12, one wall 13 of which has a lock switch, indicated generally by the numeral 14, mounted thereon with the front end of its cylinder 15 projecting through a hole in the wall 13.

The wall 13 forms an acute angle with the side wall 10 of the glove compartment and is so positioned that the key 16 of the lock switch points toward the driver. The recess 12 is deep enough so that no part of the key 16 projects beyond the general plane of the panel, which is desirable from the standpoint of safety.

Inasmuch as the specific construction of the lock switch 14 forms no part of this invention, it is not shown. Suffice it to say that the cylinder 15 upon having its tumblers (not shown) retracted by the insertion of the key 16 is free to be turned, and that rotation of the cylinder carries a movable contact 17 to and from a closed position electrically bridging stationary contacts 18 to which terminals 19 are electrically attached. The terminals 19 have conductors 20 connected thereto by screws 21, and if the lock switch is being used to control the ignition, the conductors 20 enter a cable 22 which leads to the proper instrumentalities of the ignition system under the hood.

It is to be observed that the angular disposition of the lockswitch places its terminals in juxtaposition to the hole 11 in the side wall of the glove compartment so as to be accessible from the inside of the glove compartment. Inasmuch as access to the lock switch from below is precluded by the flange 5' which underlies the lock switch as well as the compartment, expensive armouring for the conductors leading from the lock switch to the engine compartment need not be provided, for by locking the door of the glove compartment, all access to the terminals of the switch is guarded against.

This construction also facilitates the installation of the lock switch.

Figure 5:
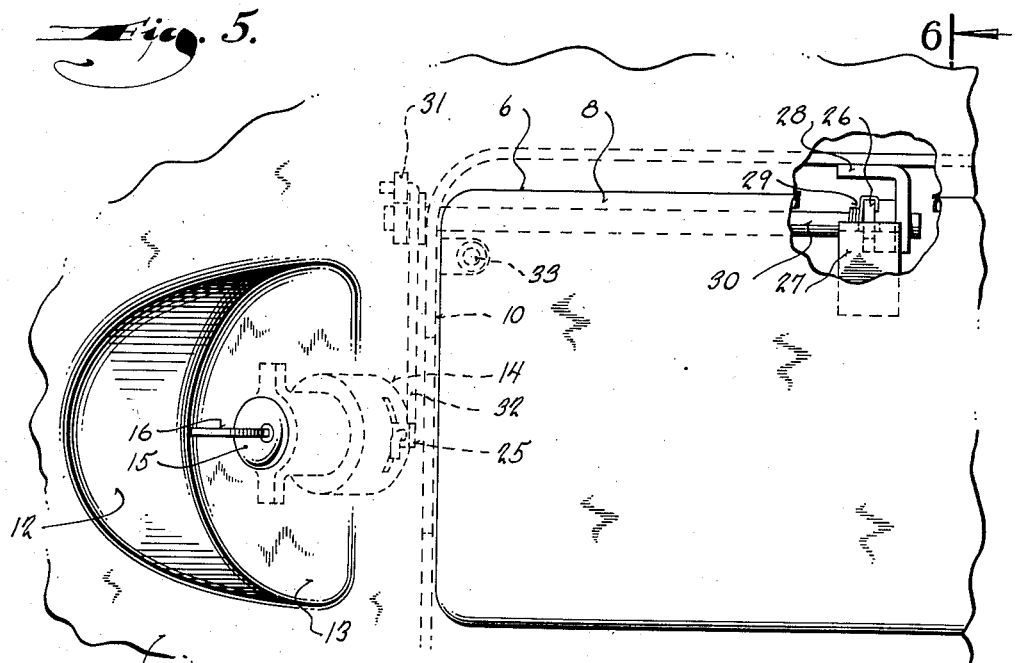
Figure 5 is a front view of the instrument panel portion shown in Figure 4.
Figure 6:
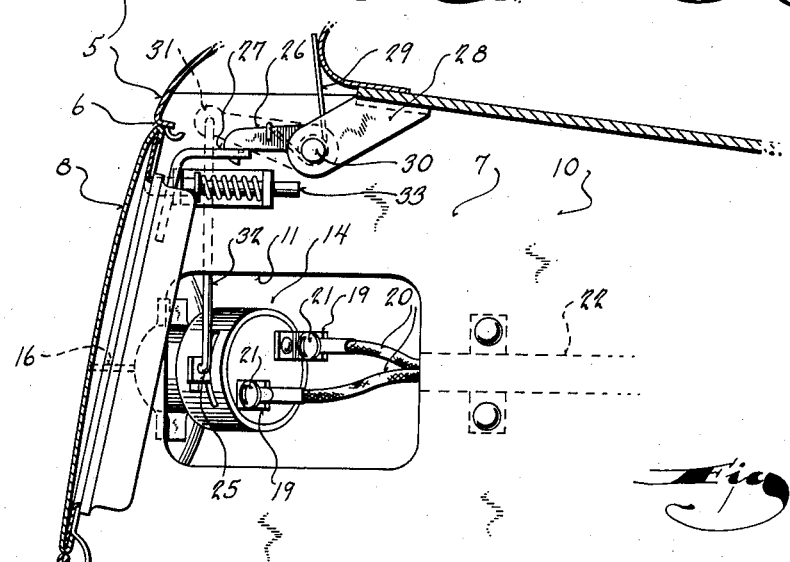
Figure 6 is a cross sectional view taken through Figure 5 on the plane of the line 6—6.

As illustrated in Figures 4, 5 and 6, the lock switch can be used also to lock the door of the glove compartment. This is accomplished by providing the lock cylinder with a driving lever 25. The lever projects from the side of the lock casing and is swung through an arc upon rotation of the cylinder. The motion thus imparted to the lever 25 is utilized to disengage a hook 26 from a door carried latch 27. The hook 26 is pivoted from a bracket 28 fixed to the top wall of the glove compartment and is yieldingly urged to an operative position engageable with the latch 27 by a torsion spring 29.

A shaft 30 having one end journalled in the bracket 28 has the hook fixed thereto so that motion may be imparted to the hook through the shaft. The opposite end of the shaft passes through a hole in the side wall 10 of the glove compartment and has a lever 31 fixed thereto. This lever 31 is connected to the lever 25 through a link 32.

Lost motion is preferably provided at some point between the lock cylinder and the hook 26 so that the normal actuation of the lock switch to open and close the switch need not disengage the hook 26 from the door carried latch, but upon rotation of the cylinder beyond one of its normal limits, the hook will be lifted clear of the latch. Upon such disengagement of the hook 26 from the door carried latch, a spring urged plunger 33 pushes the door open. When the door is closed, the spring plunger 33 prevents rattling.

From the foregoing description taken in connection with the accompanying drawings, it will be readily apparent to those skilled in the art, that this invention provides an improved lock switch installation for automobiles, and that by preventing access to the terminals of the switch except through the glove compartment, expensive armoured cable leading from the switch to the engine compartment is obviated, and installation of the switch is facilitated.

It is also apparent that this invention increases the safety of an automobile by eliminating one of the customary projections on the instrument panel.

What I claim as my invention is:

1. In combination: an automobile instrument panel; a glove compartment behind the panel having a hole in one of its side walls; a lock switch having a set of movable contacts, and terminals; a key controlled cylinder lock for actuating the movable contacts into engagement with said terminals; a recess in the instrument panel having an inclined wall upon which the lock switch is mounted so that its axis points toward the glove compartment to dispose its terminals adjacent to the hole in the side wall of the glove compartment to be accessible from the inside of the compartment; said recess being deep enough to position the key inwardly of the general plane of the panel.

2. In combination: an automobile instrument panel having a recess with one wall thereof inclined to the general plane of the panel; a compartment in back of the panel having a side wall close to said inclined wall of the recess, said side wall having a hole therethrough; and a lock mounted on said inclined wall with its axis passing through the hole and its inner end accessible from inside the compartment through the hole.

3. In combination: an automobile instrument panel having a recess with one wall of the recess inclined at such an angle that a line normal to the plane of the inclined wall points toward the driver's seat of the automobile; and a key operable lock mounted on said inclined wall with its front end opening through the wall to receive a key.

4. In combination: an automobile instrument panel having a recess with one wall of the recess inclined at such an angle that a line normal to the plane of the inclined wall points toward the driver's seat of the automobile; and a key operable lock mounted on said inclined wall with its front end opening through the wall to receive a key; said recess being deep enough so that no portion of the key when in position in the lock projects beyond the general plane of the instrument panel.

5. In combination: an automobile instrument panel; a compartment in back of the panel having a side wall provided with a hole; the instrument panel having a recess adjacent to said side wall of the compartment; one wall of said recess being inclined to form an acute angle with said side wall of the compartment; and a lock mounted on said inclined wall with its inner end adjacent to the hole in the side wall of the compartment.

6. In combination: an automobile instrument panel; a compartment behind the panel having an entrance opening through the panel and having an opening affording access to the space behind the panel; a door for closing the opening; a lock switch mounted on the panel alongside the compartment and including a rotatable lock cylinder, a set of stationary and movable contacts, and terminals accessible upon opening of the compartment door; conductors leading to the terminals from a point remote from the compartment and the panel; a latch for the compartment door; and a connection between the cylinder of the lock switch and the latch whereby said lock switch has the additional function of controlling said latch.

7. In combination: an automobile instrument panel; a compartment behind the panel having an entrance opening through the panel and having a hole in one of its side walls; a lock mounted on the instrument panel in juxtaposition to said side wall of the compartment and in position to have its inner end accessible from inside the compartment through the hole in its side wall; a door for closing the entrance opening of the compartment; and locking means for the door controlled from said lock.

8. In combination: an automobile instrument panel having a flange extending back from its lower edge; a glove compartment in back of the panel and having an entrance opening in the panel, said entrance opening being closed by a door adapted to be locked; one side wall of the glove compartment having a hole; and a lock switch mounted on the instrument panel and having terminals guarded by being behind the instrument panel and above the flange extending from the lower edge of the instrument panel, but said terminals being accessible through the interior of the glove compartment when the compartment door is unlocked.

9. In combination: an automobile instrument panel; a glove compartment behind the panel having a hole in one of its side walls; a key-controlled lock switch having a set of movable contacts and terminals; and a mounting surface for the lock switch on the instrument panel beside the compartment, said mounting surface being disposed at an angle to the face of the instrument panel whereby the lock switch axis is inclined toward said side wall of the compartment so that the terminals of the switch are disposed adjacent to the hole in the side wall to be accessible from inside the compartment.

10. An instrument panel comprising a face portion; a compartment in the space behind said face portion, said compartment having a hole in one side wall affording access to said space and said face portion of the panel having a hole adjacent to said side wall; a switch having an actuator and terminals; and means mounting the switch with its longitudinal axis angular to the plane of said face portion and said side wall of the compartment so that its actuator is accessible through the hole in the panel and its terminals are accessible through the hole in the side wall of the compartment.

11. An instrument panel comprising a face portion having an indentation to provide a recess which extends into the space behind the face portion of the panel; a compartment in said space, said compartment having a hole in a wall adjacent to said recess affording access to said space; a switch having an actuator and terminals; and means mounting the switch from the bottom of the recess with its actuator disposed entirely within the confines of the recess and its terminals in said space adjacent to the hole in said wall of the compartment so as to be accessible from the interior of the compartment.

12. An instrument panel comprising: a face portion; a compartment in the space behind the face portion, said compartment having a hole in one side wall; an electric switch having terminals on its inner end portion; and means mounting the electric switch from the face portion of the panel adjacent to said side wall of the compartment with the longitudinal axis of the switch inclined toward the hole in said side wall and with its terminals readily accessible from inside the compartment through the hole in its side wall.

13. In an automobile having a driver's seat: an instrument panel comprising a face portion; a compartment in the space behind the face portion, said compartment having a hole in a wall adjacent to said face portion; an electric switch having an actuator and terminals; and means mounting the electric switch with its longitudinal axis angular to the face portion of the panel and the adjacent wall of the compartment and with said axis of the switch on a line approximately joining the hole in said wall of the compartment and the driver's seat and with the actuator of the switch accessible from in front of the face portion of the panel and pointing toward the driver's position so that its terminals are adjacent to the hole in said wall of the compartment to be accessible therethrough from inside the compartment.

EDWARD N. JACOBI.